(12) United States Patent
Gunness

(10) Patent No.: US 9,341,540 B2
(45) Date of Patent: May 17, 2016

(54) LEAK DETECTION AND LOCATION SYSTEM, METHOD, AND SOFTWARE PRODUCT

(71) Applicant: Clark Robert Gunness, Nashville, TN (US)

(72) Inventor: Clark Robert Gunness, Nashville, TN (US)

(*) Notice: Subject to any disclaimer, the term of this patent is extended or adjusted under 35 U.S.C. 154(b) by 407 days.

(21) Appl. No.: 13/968,079

(22) Filed: Aug. 15, 2013

(65) Prior Publication Data

US 2014/0049247 A1  Feb. 20, 2014

Related U.S. Application Data

(60) Provisional application No. 61/683,366, filed on Aug. 15, 2012.

(51) Int. Cl.
*G01M 3/40* (2006.01)
*G01M 3/18* (2006.01)

(52) U.S. Cl.
CPC .. *G01M 3/40* (2013.01); *G01M 3/18* (2013.01)

(58) Field of Classification Search
CPC ........... G01M 3/40; G01M 3/18; G01M 3/16; E04D 13/006
USPC .......................................................... 73/49.5
See application file for complete search history.

(56) References Cited

U.S. PATENT DOCUMENTS

| | | | | |
|---|---|---|---|---|
| 4,404,516 A * | 9/1983 | Johnson, Jr. | .......... | G01M 3/045 324/525 |
| 4,947,470 A * | 8/1990 | Darilek | .................. | G01M 3/40 324/326 |
| 5,081,422 A * | 1/1992 | Shih | ...................... | E04D 13/006 324/693 |
| 5,288,168 A * | 2/1994 | Spencer | .................. | E02D 31/00 324/559 |
| 5,550,532 A * | 8/1996 | Marshall | ................. | G01M 3/16 137/312 |
| 6,056,477 A * | 5/2000 | Ueda | ........................ | B09B 1/00 340/605 |
| 6,222,373 B1 * | 4/2001 | Morrison | ................ | G01M 3/16 324/532 |
| 6,331,778 B1 * | 12/2001 | Daily | ....................... | G01M 3/16 324/512 |
| 7,292,155 B2 * | 11/2007 | Vokey | .................... | E04D 13/006 340/602 |
| 8,319,508 B2 * | 11/2012 | Vokey | ..................... | C23F 13/02 324/522 |
| 8,566,051 B2 * | 10/2013 | Gunness | ................. | G01M 3/16 324/444 |
| 8,970,201 B2 * | 3/2015 | Durkheim | ............. | E02D 31/004 324/71.1 |
| 2002/0028110 A1 * | 3/2002 | Rhee | ....................... | G01M 3/04 405/129.5 |
| 2009/0044595 A1 * | 2/2009 | Vokey | ................... | G01M 3/165 73/1.17 |
| 2011/0178747 A1 * | 7/2011 | Gunness | ................. | G01M 3/16 702/65 |
| 2012/0197565 A1 * | 8/2012 | Gunness | ............... | G01M 3/165 702/64 |
| 2014/0114590 A1 * | 4/2014 | Gunness | ................. | G01M 3/40 702/51 |
| 2014/0361796 A1 * | 12/2014 | Vokey | .................... | G01N 27/20 324/71.1 |
| 2015/0168329 A1 * | 6/2015 | Gunness | ................. | G01M 3/16 324/663 |

* cited by examiner

*Primary Examiner* — Freddie Kirkland, III
(74) *Attorney, Agent, or Firm* — Catherine Napjus; Michael Persson; Lawson, Persson & Weldon-Francke, PC

(57) ABSTRACT

Systems, a software product, and a method for leak detection and location where there are multiple distinct layers of waterproofing or roofing membranes separated by insulation or other building materials to create a sealed roofing envelope and in which the system monitors leakage from the primary and secondary membranes and also monitors leakage from the edges of the roofing or waterproofing envelope formed by the membranes.

36 Claims, 9 Drawing Sheets

LEAK DETECTION AND LOCATION SYSTEM, METHOD, AND SOFTWARE PRODUCT

CLAIM OF PRIORITY

This application claims the benefit of priority of U.S. Provisional patent application Ser. No. 61/683,366, filed on Aug. 15, 2012.

FIELD OF THE INVENTION

The present invention relates to the detection and location of water leakage in structures, and in particular to computer controlled leakage detection and location systems for structures with multiple waterproofing layers.

BACKGROUND

Roof and waterproofing membranes and linings have long been used to protect buildings, to contain water in ponds and decorative water features, to prevent leaching of contaminants from landfills, and for other purposes. While these membranes have utility, leakage through the membranes is an ongoing problem. The efforts to contain and locate leakage have resulted in the rise of specialized consultants, air and vacuum testable membranes, and, in recent history, electrical testing methods that not only determine if a leak is present in a membrane system, but where the leak is located.

Because of recurring problems with leakage, designers are starting to plan roofing and waterproofing assemblies which have two or more distinct layers and which comprise the same or different type of membrane for each layer with each layer separated by construction materials, such as insulation, which creates a space between the membranes. These designs are used over critical spaces where leakage of any sort cannot be tolerated, such as hospitals, laboratories, libraries and book depositories, data centers and museums, to name a few. What used to be considered a vapor barrier applied to the roof deck to prevent vapor incursion into the roofing envelope from the space below now often serves double duty and is considered to be a secondary protection membrane capable of stopping water that encroaches into the roofing envelope due to leakage in the primary, uppermost membrane. Put in another way, the top layer of membrane is the primary waterproofing layer which is responsible for keeping the entire roofing or waterproofing envelope and the space under the envelope protected from moisture. The second and, if designed, third or more lower layers, act as back-up protection for leakage from the primary membrane in that, if the primary waterproofing layer does leak, the water will theoretically be stopped by the secondary or even subsequently lower waterproofing layer or layers.

This system of multiple membranes is well known in the environmental containment industry, which uses at least two sets of liners, the first to act as the primary containment and the others to act as the secondary or tertiary containment and leak detection layer. These multiple membrane systems are in common use in landfills, lagoons, and other structures which contain solids, or water and waste that can generate an unwanted flow of leachate or other waterborne contaminants into the surrounding land or ground water.

It is also known that the multiple membrane systems can be fitted with automatic leak detection systems, usually located between the two liners, if a dual system, or at the bottom liner. Underground and above ground storage tanks can have the same features. These leak detection systems operate either by directly sensing liquid which has come into the secondary containment space from a breach in the primary containment, or by charging the top surface of the primary containment, which charge is detected by a sensor array under the primary containment and above the secondary or tertiary liner. Systems, such as those sold under the trademark Geologger, owned by Progeo GmbH, are designed to detect leaks in this fashion.

In civil structures, the secondary liner does not have leak detection that determines its own integrity and normally has drainage structures, pipes and channels to evacuate any accumulated leakage from the primary liner that impacts the secondary liner safely to the outside of the lined facility. The ability of dual lined civil structures to drain both the primary and secondary liners is accomplished by sloping the soils upon which the liners are placed. There are normally no occupied spaces underneath these civil structures. Further, it is recognized by the engineering community and by the governments in many countries that civil liners may leak a small quantity because of the stresses and loads applied to these membranes. Civil membranes are often very difficult to reach once in service without removing massive amounts of overburden, as is the case in landfills etc., or draining large sewage or chemical retention ponds in order to get at areas that cause small amounts of leakage. Thus the criterion, 20 gallons per acre per day per foot of water head has been developed by the government in conjunction with the engineering community as an acceptable level of leakage for civil membranes.

This is not the case with the roofs, decks and foundations of buildings. These types of structures often rely on level decks and vertical walls upon which they construct the roofing and waterproofing. Tapered insulation often provides the primary slope for roof drainage, and there is almost always occupied space under the roofing and waterproofing membranes. Further, it is recognized, and is the subject of numerous cases in the courts and in arbitrations, that these membranes are not supposed to leak at all and are expected to fulfill this function perfectly.

Roofing and waterproofing in buildings can be tested in the same way as civil membranes, and other Progeo Smartex systems and systems designed by others accommodate this feature. However, with the advent of multiple layer roofs in which the roofing or waterproofing membranes are separated from one another by insulation or other building materials, it is difficult to test and report on all the layers of membranes using one integrated real-time automated system and to determine exactly the time and source of any leakage at any level. To complicate matters, water that incurs at the edges of the primary waterproofing or roofing membrane or at the secondary roofing or waterproofing membranes is not automatically and/or timely detected on all levels by the design of any currently existing automatic leak detection system. Thus, water incursion into the roofing or waterproofing envelope from exterior structures impinging on the roofing membrane or envelope such as window walls, curtain walls, vents, mechanical units, curbs, parapets and the like normally goes undetected until such leakage shows up in the building. By that time, some portion, or all of the area of the secondary or tertiary backup membranes is saturated. This lack of detection, then, leads to roofs in which the insulation in the roofing envelope becomes saturated with water incurring from the above described edges of the roofing system. The leakage remains completely undetected because of the lower, secondary roofing or waterproofing membrane or because the vapor barrier is holding the water back.

Leakage is only detected when water sitting on the secondary membrane overtops the curb, penetrations through the roof deck, top of the window wall or curtain wall, or leaks through a damaged portion or a faulty seam in the secondary membrane, or the like. Further, it is never known for certain where the water which is now on the secondary membrane has come from. It could have come from a leak in the primary roofing membrane, from a penetration through the roof as described above, or from walls directly adjacent to the roof, all of which contain flashing designed to keep water out of the roofing envelope. A further complication is that oftentimes this leakage falls directly from a penetration or impinging structure without ever affecting the roofing envelope, but is blamed on the roofing envelope as water is "coming from the roof"

This current invention proposes to solve the above-mentioned problems by providing a combination of known methods for automatically detecting leakage in the primary roofing membrane, detecting leakage in the secondary roofing membrane, and a new method to monitor all of the edge conditions around the secondary roofing membrane regarding any water incursion into the system.

SUMMARY OF THE INVENTION

The present invention is systems, a software product, and a method for leak detection and location where there are multiple distinct layers of waterproofing or roofing membranes separated by insulation or other building materials to create a sealed roofing envelope.

In its most basic form, system one for detecting and locating leakage in multi-layered roofing and waterproofing membranes includes a first impulse cable, a second detector array, at least one signal generator, and a computer. The first impulse cable is instrumental in detecting leaks in the uppermost membrane of the structure. The second detector array detects leaks in a lower membrane below the uppermost membrane of the structure. The second detector array includes at least one second impulse cable a second conductive material, and at least one second sensor. The at least one signal generator is in electrical communication with the first and second impulse cables and applies a distinct, known voltage to each of the first and second impulse cables. The computer is in electrical communication with the first and second impulse cables, the at least one signal generator, and the second sensors. It is understood that the electrical communication between the first and second impulse cables and/or the second sensors and the computer may be indirect and via the at least one signal generator. The computer includes a processor, memory, and a software product stored in the memory and executable by the processor.

The first impulse cable surrounds an area to be tested for leaks on the top surface of the uppermost membrane. The first impulse cable may be positioned in a closed or open loop or other geometric shape or meanderform or S-shaped. As used herein, when it is said that an impulse cable is "surrounding" an area to be tested, it is understood that this may mean the impulse cable is positioned in any of the ways mentioned above. More than one first impulse cable may be included for covering a large area of the uppermost membrane.

Regarding the second detector array, the second impulse cable surrounds an area to be tested for leaks on the top surface of a lower membrane. The lower membrane may be the lowermost membrane of the structure, or it may be a membrane between the uppermost membrane and the lowermost membrane. The lower membrane may be a vapor barrier. The second impulse cable may be positioned in a closed or open loop or other geometric shape or meanderform or S-shaped. More than one second impulse cable may be included for covering a large area of the lower membrane. The second impulse cable is in physical contact with, either above or below, the second conductive material. The second conductive material is preferably a felt, mesh, screen, netting, such as hex netting, scrim, or foil but may be other more or less conductive materials commonly used in the art. The term "netting" includes metal or non-metal meshes, screens, hex nettings, and scrims. It is understood that the second conductive material may fall anywhere in a range of conductivity. In other words, the second conductive material may be only very minimally conductive, but it must have some degree of conductivity. The at least one second sensor is positioned within the area to be tested, in physical contact with, either above or below, the second conductive material. The at least one second sensor is preferably a plurality of sensors or sensor array.

The at least one signal generator may be a single signal generator that applies distinct, known voltages to each of the first and second impulse cables, respectively. The at least one signal generator may also be a first signal generator in electrical communication with the first impulse cable only and a second signal generator in electrical communication with the second impulse cable of the second detector array only. Whether the at least one signal generator is a single signal generator or first and second signal generators, the at least one signal generator is in electrical communication with the computer. It is preferred that the at least one signal generator generate a signal of 42 V or less, but may be as high as 50 V.

The second detector array in combination with the signal generator and computer operate as described in the inventor's co-pending U.S. patent application Ser. No. 13/009,356, which is hereby incorporated by reference. When voltage is applied to the second impulse cable, and no leak is present in the lower membrane, each second sensor will detect the same voltage. When voltage is applied to the second impulse cable, and a leak is present in the lower membrane, then the current flows to ground, and the second sensors detect the change in voltage. The location of the leak may be determined by the voltages detected by the second sensors and their physical position on the second conductive material.

The second detector array also works in concert with the first impulse cable to detect leaks in the uppermost membrane on which the first impulse cable is disposed. Building material, such as insulation, separates the uppermost membrane and the lower membrane. If there is a leak in the uppermost membrane, then the building material will get wet and current from the first impulse cable will be detected by the second sensors below the building material. The second sensors will detect the distinct voltage applied to the first impulse cable on the uppermost membrane and therefore detect that the leak is in the uppermost membrane, and not the lower membrane. Voltage applied to the first impulse cable may also be varied and the first impulse cable or several first impulse cables may be positioned in distinct locations so that the leak may be more specifically located. In addition, because water in the environment, and particularly rainwater, has a low electrical conductivity, the known voltage from any impulse cable will be attenuated by the carrying water depending upon its distance through the building material from the breach in the uppermost membrane. This attenuation allows for a more closely determined area of leakage.

The water is the carrier of the signal and has nothing to do with the attenuation of the signal at the level of the conductive material. The conductive material attenuates the signal as it passes through the material to any sensor. This attenuation caused by the second conductive material allows the second sensors to detect and the computer to see voltages differences between second sensors in different locations. This differentiation allows the computer to triangulate to the spot where the water touched the second conductive material. That said, attenuation with water alone, if the water travels along building materials, such as insulation boards, for a significant distance, such as more than 10 feet, before it drops to the second conductive material, would be significant. The resulting lower measurement could indicate that the leak is offset from the point at which the water meets the second conductive material.

One of ordinary skill in the art will recognize that several second impulse cables and second conductive materials may be used on several levels of waterproofing membranes below the uppermost membrane. It is preferred that at least the lowest lower membrane being monitored for leaking includes second sensors. Any or all lower membranes may include second sensors, however. In this way, several layers of water proofing membranes may be monitored for leaks. The use of distinct voltages applied to the various impulse cables on the various levels provides a unique signature so that computer receiving information from the second sensors picking up the voltage on the lowest lower membrane will be able to determine which membrane has been breached. System one, as described above, will provide information as to which membrane, if any has a leak, and where the leak is on that membrane.

Preferred embodiments of system one also include a third detector array, as described below with reference to system two of the present invention.

In its most basic form, system two of the present invention is a third detector array, a signal generator, and a computer. The third detector array detects leaks in penetrations or impinging walls in or around the waterproofing envelope. The penetrations or impinging walls can be monitored for water incurring into the roofing or waterproofing envelope resulting from leakage. Hereinafter, the term "impingements" should be understood to include anything that penetrates a waterproofing membrane, such as penetrations and impinging walls. Examples of penetrations include vent stacks, curbs for air conditioning units, and fan units. Impinging walls are walls that border a roof area, as well as parapets that run through a roof. Any wall that has a roof flashing up against it is an impinging wall. "Impingement" refers to any of the structures included within either of these terms that impinge on or interrupt a waterproofing or roofing membrane. Although impingements usually impinge on all roofing membranes included in a multi-layered roofing and waterproofing membrane assembly, it is understood that some impingements may impinge on only one or less than all layers.

The third detector array includes at least one second impulse cable, a third non-conductive material, and at least one third sensor. The unadulterated third non-conductive material is not at all conductive. The third non-conductive material is preferably able to absorb water so that it will become conductive when a leak has caused the third non-conductive material to be wet, as described below. Some embodiments of the third non-conductive material are effective although not absorbent, however. The third non-conductive material is applied to an impingement. For example, the third non-conductive material is applied over the vertical surface of any impingement and laid from that vertical surface onto the adjacent horizontal surface. The at least one sensor is disposed upon either the vertical portion of the third non-conductive felt covering the vertical surface of the impingement or the horizontal portion of the third non-conductive felt covering the horizontal surface adjacent to the impingement. The signal generator is in electrical communication with the second impulse cable and applies a certain known voltage to the second impulse cable. The computer is in electrical communication with the second impulse cable, the signal generator, and the third sensors. It is understood that the electrical communication between the second impulse cables and/or the third sensors and the computer may be indirect and via the at least one signal generator. The computer includes a processor, memory, and a software product stored in the memory and executable by the processor.

In practice, if the third non-conductive material remains dry because there is no leak in the impingement, then the third sensors will detect no current. If the third non-conductive material is wet because of a leak in the impingement, then the third sensors will detect a current, and the computer will indicate that there is a leak in the impingement. The strength of the signal detected by the third sensors will also indicate the location of the leak. If an impingement is short and contained, such as the curb of a fan or HVAC unit, then only one third sensor may be used. For longer, continuous impingements, such as flashing at a window wall, more than one third sensor in a row is necessary so that the computer may compare voltage readings of different third sensors down the line. This comparison will indicate at least what portion of the impingement is being impacted by the leak.

As mentioned above, the third detector array of system two of the present invention combined with system one of the present invention is a preferred embodiment of system one of the present invention. System one of the present invention combined with the third detector array of system two of the present invention is also a preferred embodiment of system two of the present invention. In addition, a preferred embodiment of system two of the present invention may include the second detector array of system one only in combination with the third detector array of system two.

In any of these combinations, the second impulse cable of the third detector array and the second impulse cable of the second detector array are the same impulse cable and the signal generator and computer are the same signal generator and computer used in connection with the second detector array. In such embodiments, the second impulse cable is set back from any impingements. The set back is preferably at least 1 inch, but there need only be a minimal physical space between the second impulse cable and the impingement. Again, the second impulse cable may be positioned either on top of or directly below the second conductive material, so long as the second impulse cable is in direct physical contact with the second conductive material. The third non-conductive material is applied to an impingement. For example, the third non-conductive material is applied over the vertical surface of any impingement and laid from that vertical surface onto the adjacent horizontal surface. The horizontal surface coincides with the surface covered by the second conductive material and overlaps that second conductive material such that it extends beyond the position of the second impulse cable. This overlap is preferably at least 1 inch, but need only be a minimal physical contact along the common edge. The at least one third sensor, which is preferably a plurality of third sensors or sensor array, is positioned on top of the third non-conductive material, within the set-back area described above, just outside of the area to be tested by the second detector array, delineated by the second impulse cable. The third non-conductive material is preferably a felt, mesh, coated screen, hydrophobic cloth, or plastic capillary medium, but may be other non-conductive materials commonly used in the art. A plastic capillary medium is a non-absorbent plastic that includes small holes that will cause an upward or outward capillary flow. One of ordinary skill in the art will recognize that several third detector arrays may be advantageously used to detect leaks in a number of impingements interrupting a single lower membrane.

Preferred embodiments of system one or two include an ammeter in electrical connection with the second and also, if desired, with the first impulse cable. One ammeter can perform the measuring function on both cables independently, or separate and distinct ammeters can perform the measuring functions for each type of cable respectively. The ammeter or ammeters may also be in electrical communication with the computer so that the amperage may be monitored and stored.

In practice, the impulse cable "bleeds" part of its electrical energy into the area that is conductive. The area that is conductive may be inside and outside the area surrounded by the impulse cable, and the bleed may be measured, usually in milliamps. This initial reading gives system installers a baseline from which they can compare future readings. This allows for measuring of the ambient amperage of the second and/or first impulse cables throughout installation and construction, the advantages of which are described in more detail below with respect to the method of the present invention.

Preferred embodiments of system two will therefore inform as to whether the uppermost membrane, the lower membrane, or an impingement has a leak. If the uppermost membrane has a leak, the second sensors will detect a distinct voltage trying to ground through the wet building material between the uppermost membrane and the lower membrane. If the lower membrane has a leak, the second sensors will detect a different distinct voltage pattern. If the impingement has a leak such that the third non-conductive material is wet, then the third sensors will detect a voltage. Finally, even if the impingement has a leak such that the third non-conductive material is not wet, if a leak is visible, but no leak has been indicated in either the uppermost or lower membranes, then, by process of elimination, it is known that the impingement is causing the visible leak even in the absence of the third sensors detecting a voltage. If the impingement is leaking behind the flashing or within a fan or air conditioning unit, for example, then the third non-conductive material may not necessarily get wet, although a leak is visible below, within the structure. Although this might look like a roof leak, if both the uppermost and lower membranes are being monitored and no leak alert has been issued, then the leak must be from the impingement.

The software product of the present invention includes first signal software code that, when executed, causes the computer to indicate to the at least one signal generator to apply a voltage to the first impulse cable; second signal software code that, when executed, causes the computer to indicate to the at least one signal generator to apply a voltage to the second impulse cable; first ammeter software code that, when executed, reads the amperage of the second impulse cable to which the first ammeter is electrically connected; second sensor polling software code that, when executed, causes the computer to poll each of the at least one second sensors for the voltage detected at each of the at least one second sensor; third sensor polling software code that, when executed, causes the computer to poll each of the at least one third sensors for the voltage detected at each of the at least one third sensor; detection software code that, when executed, causes the computer to compare differences in voltage between adjacent second sensors and adjacent third sensors and changes in voltage in a single second sensor and third sensor; mapping software code that, when executed, causes the computer to transpose a representation of an electrical field onto a topological or isobar-type map of the uppermost membrane, lower membrane, and impingement; impingement alert software code that, when executed, causes the computer to send an alert as to a leak in the impingement; uppermost membrane alert software code that, when executed, causes the computer to send an alert as to a leak in the uppermost membrane; and lower membrane alert software code that, when executed, causes the computer to send an alert as to a leak in the lower membrane. First ammeter code, when executed, may also read an amperage of the first impulse cable if the first ammeter code is connected to both the first and second impulse cables. The software product may also include second ammeter code, which, when executed, reads an amperage of the first impulse cable to which it is connected separately.

In its most basic form, the method of the present invention includes the steps of applying a second conductive material over a lower membrane; positioning a second sensor array within the area on the lower membrane to be tested for leaks and in physical contact with the second conductive material; connecting the second sensor array electrically to the computer; applying a third non-conductive material vertically around and horizontally away from an impingement interrupting the lower membrane such that the horizontal portion of the third non-conductive material overlaps with the second conductive material; positioning a third sensor array on top of the third non-conductive material; connecting the second sensor array electrically to the computer; polling by computer each of the sensors in the second and third sensor arrays for voltage measurements at the location of each of the sensors; and mapping the impingement and lower membrane by computer.

In this most basic form of the method of the present invention, no impulse cables are included so no voltage is directly applied. In the absence of applied voltage, increases or decreases in the ambient moisture or relative humidity in the roofing envelope will cause fluctuations in conductivity therein. Increases or decreases in humidity are a direct result of moisture getting into the envelope. This may occur because of a leak or because of moisture coming from below the envelope in the occupied space and condensing in the colder roofing envelope, for example. The relative humidity in the envelope therefore creates conductivity that is sensed by the sensors even in the absence of an applied voltage. This polling of the sensors when voltage has not been applied is another way to confirm if the envelope is performing properly and whether any conductive elements in or attached to the envelope are negatively impacting the envelope. Moreover, this basic method may void false alarms that occur with voltage application, as an active element above the membrane would show up as a possible leak when voltage is applied. Finally, the polling of the sensors in the absence of the voltage application also allows detections of events that would be overshadowed by the voltage application.

A preferred embodiment of the method of the present invention also includes the steps of applying a second impulse cable in physical contact with the second conductive material surrounding an area of the lower membrane to be tested for leaks beneath an edge of the horizontal portion of the third non-conductive material; connecting the second impulse cable to a signal generator that is in electrical connection with and receives commands from a computer; and applying a known voltage to the second impulse cable by the computer commanding the signal generator to apply the voltage.

A preferred embodiment of this last embodiment of the method also includes the steps of installing an ammeter in electrical communication with the second impulse cable; and measuring the amperage of the system once the step of applying a known voltage to the second impulse cable is performed. These steps determine the ambient amperage draw of the system. This allows the installer to determine functionality of the system in situ before any further installation or construction is performed. This provides three major advantages. First, it allows the installer to monitor the progress of the construction. Second, it allows the installer to ensure the system is being properly installed and is operating as expected. If the system indicates what appears to be a leak, for example, but no other evidence of a leak is present, it could be that water has invaded some portion of the system and has created a ground with one of the building elements. If such is the case, then the problem may be resolved during construction or before complete installation. If such a problem had gone undetected and construction were completed with the problem in place, there would be no easy way to correct the problem later on. Finally, amperage may be measured as soon as the second conductive material and second impulse cable are installed. Therefore the system may be monitored continuously throughout any further system installation and construction of the roofing envelope. This ensures that any problems with the system or construction may be detected quickly, during a time when those problems may be easily resolved. Such early problem resolution is essential because if the ability to electrically isolate the system from a grounded substrate is breached, then it is detected as an interference, or, worse, a false leak during system operation.

Preferred embodiments of the method of the present invention also include the steps of applying a first impulse cable on top of an uppermost membrane surrounding an area of the uppermost membrane to be tested; applying a known voltage to the first impulse cable that is distinct from the known voltage applied to the second impulse cable, by a computer commanding a signal generator to apply the voltage; alerting by computer as to the detection and location in at least one of the uppermost membrane, the lower membrane, and the impingement; and testing the system by computer. The polling step entails detecting field distortions, where the field distortions include differences in voltage between adjacent sensors and changes in voltage in a single sensor. The mapping step entails transposing a representation of the electrical field onto a topological or isobar-type map of the membrane or impingement to be tested and locating a leak. The testing step entails determining the presence of failed sensors and compensating for any failed sensors. The ammeter that may be connected to the second impulse cable may also be connected to the first impulse cable, or a second ammeter may be connected to the first impulse cable, and the amperage measured. The ammeter or ammeters may also be connected to the computer.

Therefore it is an aspect of the present invention to identify and locate leakage in multi-layered roofing and waterproofing membranes utilizing the principles of electrical field vector mapping for the lower membrane utilizing a set of sensors and a certain, defined voltage.

It is a further aspect of the present invention to identify and locate leakage in multi-layered roofing and waterproofing membranes utilizing the principles of dipole current flow measurement for the uppermost membrane using the same set of sensors and a different defined voltage.

It is a further aspect of the present invention to identify and locate leakage in an impingement of a multi-layered roofing and waterproofing membranes utilizing the principles of a completely electrically resistant material being compromised and made conductive by the addition of water utilizing a different set of sensors.

It is a further aspect of the present invention to apply each of these principles to a single permanently installed, computer controlled, always-on system.

It is a further aspect of the present invention to provide a system that does not indicate false leaks from conductive overburdens.

It is a further aspect of the present invention to provide a leak detection system that includes a conductive felt layer to carry current over an entire surface to be tested.

It is a further aspect of the present invention to provide a single layer membrane system with the two principles of dipole current flow measurement and electrically resistant material being compromised by water as a complete testing protocol and system.

These aspects of the present invention are not meant to be exclusive and other features, aspects, and advantages of the present invention will be readily apparent to those of ordinary skill in the art when read in conjunction with the following description, claims, and accompanying drawings.

DETAILED DESCRIPTION

Figure 1:
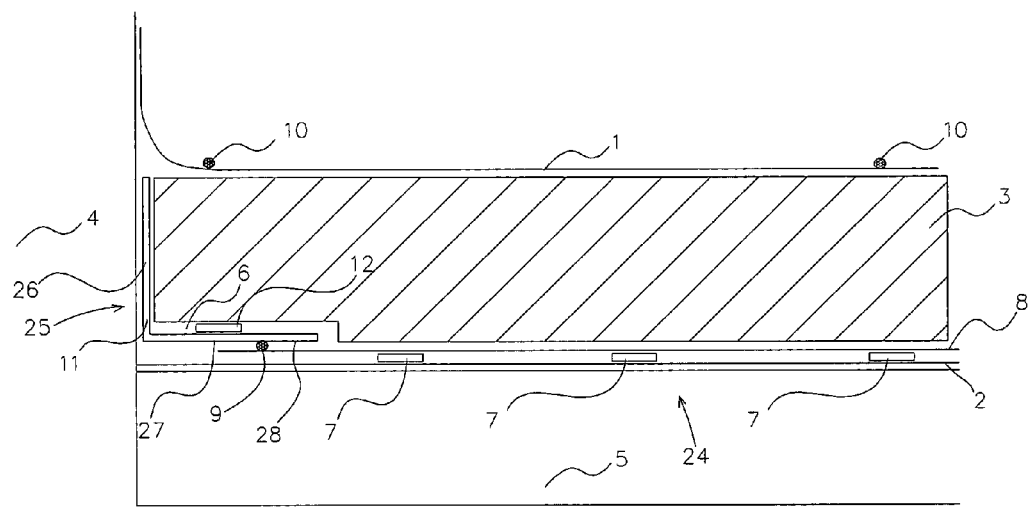
FIG. 1 is a section view of a dual layer roofing envelope showing how the second and third detector arrays are deployed and how the first impulse cable is applied to the uppermost roofing membrane.

Referring to FIG. 1, this section of the roofing or waterproofing envelope shows the deck 5 of the building over which the envelope is constructed and a lower waterproofing or roofing membrane 2 installed on the deck 5 to act as a secondary membrane. Although lower membrane 2 is shown as the lowermost membrane above the deck 5, it is understood that there may be more than one secondary membrane below the uppermost membrane 1. As such, lower membrane 2 may be positioned between the uppermost membrane 1 and the lowermost membrane, and more than second impulse cable 9 and second conductive material 8, may be advantageously used on each lower membrane 2 to detect leaks and leak locations in each membrane below the uppermost membrane 1. Second detector array 24 includes second sensors 7 arranged in a sensor array, second conductive material 8, and second impulse cable 9. Second sensors 7 are shown disposed between second conductive material 8 and lower membrane 2, but it is understood that the second sensors 7 may also be disposed on top of second conductive material 8. In addition, second impulse cable 9 is shown disposed on top of second conductive material 8, but it is understood that the second impulse cable 9 may also be disposed between second conductive material 8 and lower membrane 2. It is only required that second sensors 7 and second impulse cable 9 be in physical contact with second conductive material 8. Second impulse cable 9 surrounds the second sensors 7, defining an area of the lower membrane 2 to be tested for leaks. Second impulse cable 9 is set back from impingement 4, so that there is a set-back space 6 between second impulse cable 9 and impingement 4. Third sensors 12 of third detector array 25 are disposed within set-back space 6.

Third detector array 25 is shown on the left against impingement 4. Third detector array 25 includes third non-conductive material 11 and third sensors 12. Non-conductive material 11 is positioned on top of second impulse cable 9 and runs from the top second impulse cable 9 horizontally over to the impingement 4 and then vertically up and around impingement 4. Vertical 26 and horizontal 27 portions of third non-conductive material 11 are indicated, as well as edge 28 of the horizontal portion 27. Although third sensors 12 are indicated disposed upon horizontal portion 27 of third non-conductive material 11, it is understood that third sensors 12 may also be disposed upon vertical portion 26. Impingement 4 impinges directly on the roofing envelope including uppermost membrane 1 and lower membrane 2. First impulse cable 10 surrounds an area of uppermost membrane 1 to be tested. Uppermost membrane 1 and lower membrane 2 are separated from one another by building materials 3, such as insulation. If building material 3 included a monolithic waterproof layer, then that layer would be equipped with a secondary detector array 24 if it were the lowest layer being monitored or a second conductive material 8 and second impulse cable 9 if it were an interim layer between the uppermost membrane 1 and a lower membrane 2 disposed below the interim layer.

Figure 2:
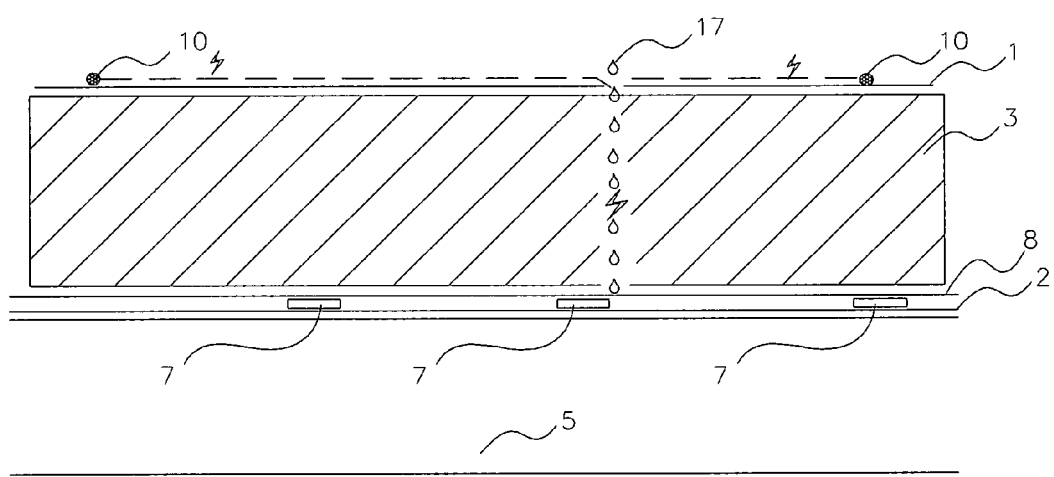
FIG. 2 is a diagram showing how a leak in the uppermost roofing membrane is detected.

Referring to FIG. 2, if there is a breach 17 in the uppermost membrane 1, water will flow into the breach 17 and through the building material 3 until it touches the conductive material 8. The conductive material 8 will transmit the signal voltage from the first impulse cable 10 to the second sensors 7 at which point the computer (shown in FIG. 4, for example), will recognize the voltage signature and alert that a leak has occurred.

Figure 3:
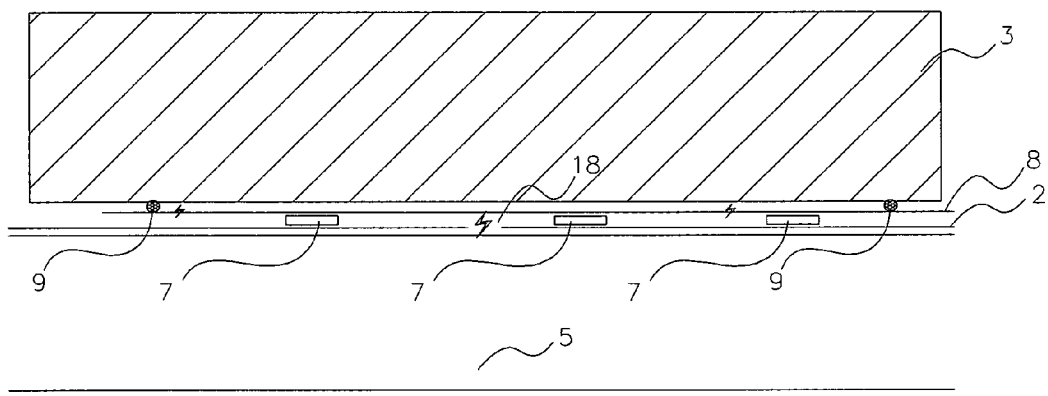
FIG. 3 is a diagram showing how a leak in the lower membrane is detected.

Referring to FIG. 3, if the lower membrane 2 develops a leak 18 and water within the roofing envelope flows into this leak, the electrical field generated by second impulse cable 9 will become distorted because of the grounding effect at the leak. This distortion is detected by the second sensors 7 at which point the computer (shown in FIG. 4, for example), will recognize the voltage signature and alert that a leak has occurred.

Figure 4:
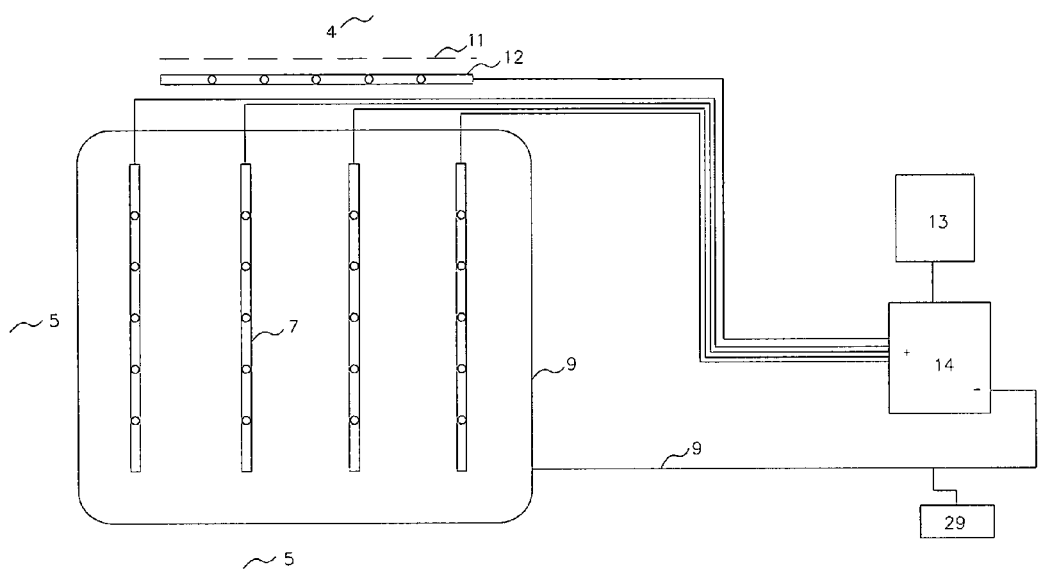
FIG. 4 is a diagram showing how the second and third sensor arrays and the second impulse cable are related to a computer, a signal generator hub, and an ammeter.

Referring to FIG. 4, a plan view showing the basic deployment of the second sensors 7 is provided. Second sensors 7 and third sensors 12 are connected to first hub 14, which is understood to also function as a first signal generator. First hub 14 is connected to and controlled by computer 13. The second impulse cable 9 is connected to the terminal on the first hub 14 opposite in polarity to the one to which the second sensors 7 are connected. The second impulse cable 9 forms a boundary around the second sensors 7. It also acts as the impulse source should the dry, non-conductive material 11 become wet because of a leak in the impingement 4. Ammeter 29 is connected to the second impulse cable 9 and measures the amount of current being drawn from the secondary impulse cable 9.

Figure 5:
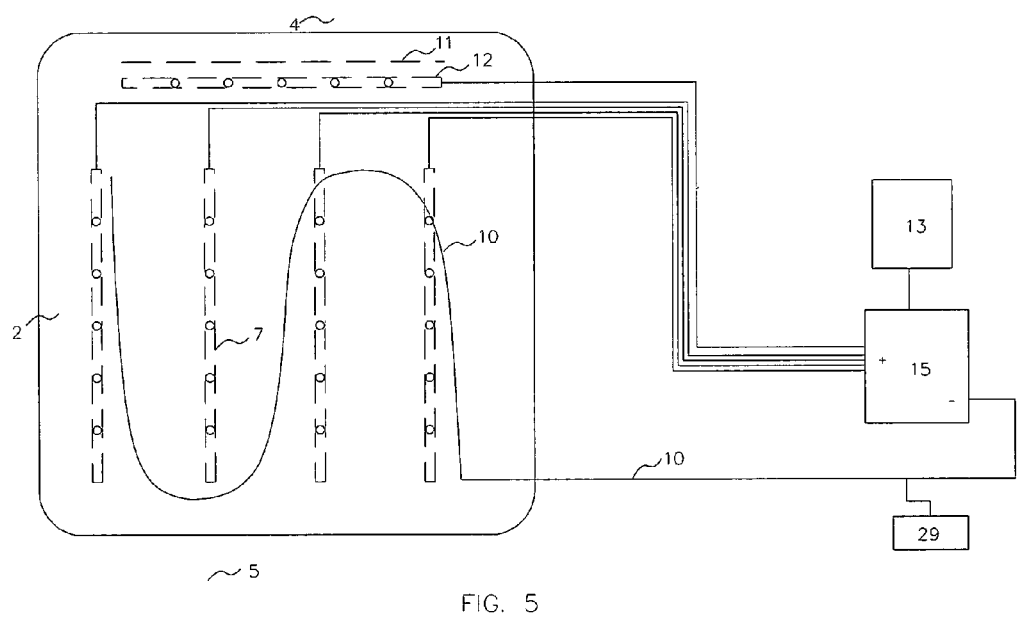
FIG. 5 is a diagram showing how the underlying second and third sensor arrays and the first impulse cable are related through the same computer, a separate signal generator hub and an ammeter.

Referring to FIG. 5, a plan view showing the uppermost membrane 1 to which is applied the first impulse cable 10 is provided. Second and third detector arrays 24, 25, applied to the lower membrane 2 and impingement 4, respectively, are shown in dashed lines to indicate that they are below first impulse cable 10 disposed upon uppermost membrane 1. First impulse cable 10 is connected to second hub 15, which is understood to also function as a second signal generator. Second and third sensors 7, 12 are also connected to the polar opposite of second hub 15 from first impulse cable 10. The first and second signal generators within first and second hubs 14, 15 generate distinct, known voltage signals so that first impulse cable 10 will deliver a voltage to the uppermost membrane 1 that is distinct from the voltage delivered by the second impulse cable 9 to the lower membrane 2. Ammeter 29 is connected to the first impulse cable 10 and measures the ambient current flow from first impulse cable 10 to any grounded elements in the structure. Only one ammeter 29 is shown connected to second impulse cable 9 in FIG. 4 and to first impulse cable 10 in FIG. 5. It is understood, however, that each impulse cable 9, 10 may have an ammeter 29 dedicated to it. Alternatively, one ammeter 29, may be connected to both first and second impulse cables 10, 9. Moreover, although not shown, ammeter 29, whether it is one or two ammeters, may be connected to computer 13.

Figure 6:
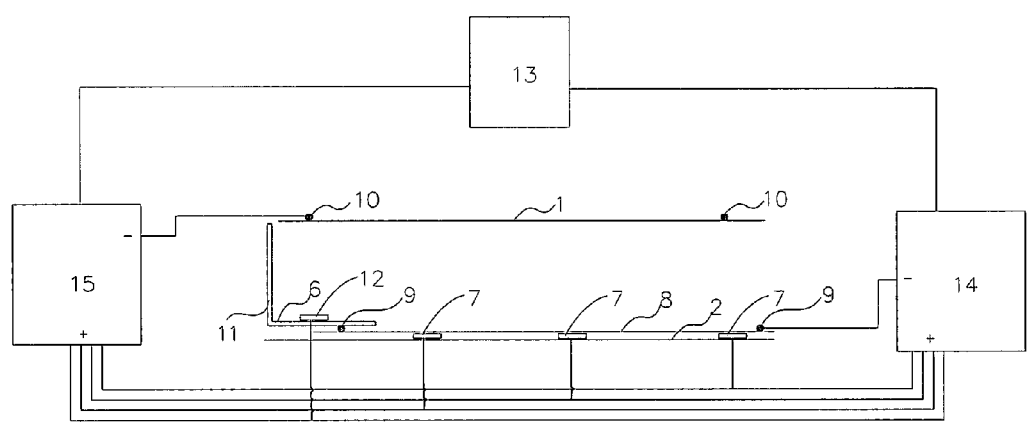
FIG. 6 is a diagram showing how both signal generator hubs controlled by the same computer use the same second sensor array and different first and second impulse cables and voltages to determine leakage at the uppermost membrane, leakage at the lower membrane, and leakage at an impingement that interrupts the roofing or waterproofing envelope.

Referring to FIG. 6, a diagram showing first and second hubs 14, 15 is provided. Controlling computer 13 communicates with both first and second hubs 14, 15, and in this way is in communication with first and second impulse cables 10, 9 and second and third sensors 7, 12. Computer 13 may therefore send commands for first and/or second hubs 14, 15 to apply a distinct, known voltage to each of first and/or second impulse cables 10, 9. In addition, computer 13 may therefore receive information from second and/or third sensors 7, 12. Although separate first and second hubs 14, 15 are shown, it is understood that in some embodiments, there is only one hub in communication with both first and second impulse cables 10, 9 and capable of applying distinct, known voltages to each. In addition, although second and third sensors 7, 12 are shown in indirect electrical communication with computer 13 via first and second hubs 14, 15, it is understood that in some embodiments, second and third sensors 7, 12 are in direct electrical communication with computer 13, and first and second hubs 14, 15 are only in electrical communication with first and second impulse cables 10, 9 and computer 13.

Figure 7:
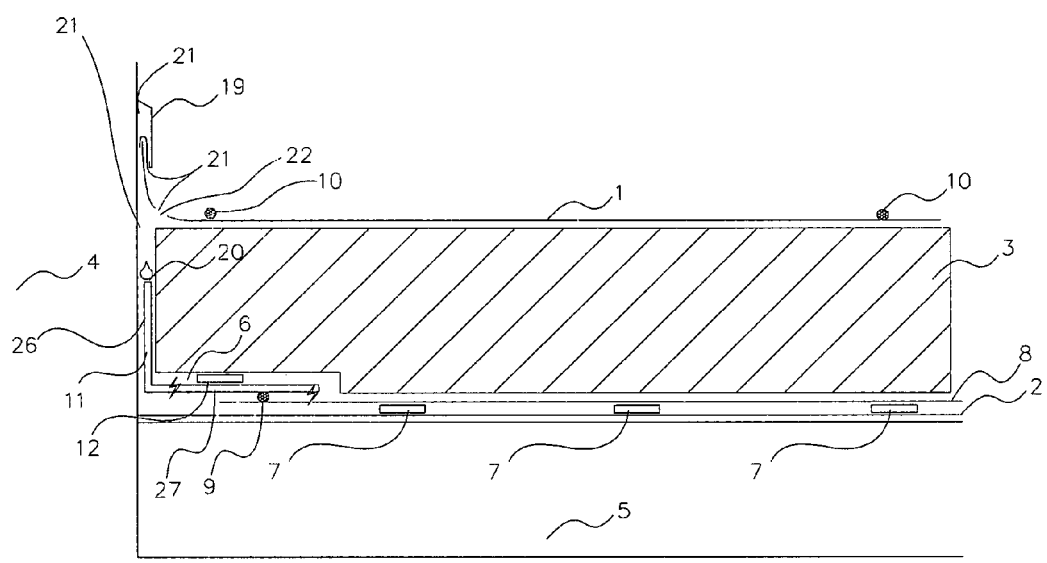
FIG. 7 is a diagram showing the situation in which leakage occurs at an impingement that is adjacent to or through the roofing envelope.

Referring to FIG. 7, a section view showing leakage of an impingement 4 is provided. In this case, impingement 4 is an impinging wall. The non-conductive material 11 is placed up against the impingement 4 that directly impinges on the roofing envelope. The non-conductive material 11 includes a vertical portion 26 running vertically down the impingement 4 and a horizontal portion 27 running horizontally across lower membrane 2, such that the non-conductive material 11 overlaps second impulse cable 9. If a leak 21 from either the impingement 4 above the flashing 19 or from the edge of the roofing membrane itself at the flashing 22 causes water 20 from leak 21 to run down the impingement 4, then the water 20 flows onto the dry, non-conductive material 11. This causes the non-conductive material 11 to saturate and allows the current generated by the second impulse cable 9 to be detected by the third sensors 12. Computer 13 will poll third sensors 12, thus providing the computer 13 with information to alert that a leak has occurred at an edge of the roofing envelope. This system functions in the same way as those systems being known as Smartex IS and MX produced by Progeo GmbH.

It is obvious that the leak detection assembly for the lower membrane 2 must be constructed before the uppermost membrane 1 is installed. Indeed, the lower membrane 2 itself must be constructed before the uppermost membrane 1 is installed. However, it is known that most roofing envelope assemblies are constructed in complete and finished portions so that inclement weather or other weather-related factors do not damage or otherwise compromise the completed roofing envelope. Oftentimes, a portion of an automatic leak detection system is installed with the roofing envelope assembly and immediately turned on to immediately detect leakage or damage to the just finished portion of the roofing envelope assembly.

The computer 13 can control multiple individual hubs 14, 15. Each of the multiple individual hubs 14, 15 may or may not have multiple connection points for multiple impulse cables. Multiple impulse cables may energize multiple levels of membranes 1, 2 or different sections of a single membrane 1, 2 in sequence. As such, each hub 14, 15 or connection point must be connected and dedicated to one or more impulse cables 9, 10 which are deployed to only one level of membrane 1, 2. Said another way, if an individual hub 14, 15 or hub connection is connected to multiple impulse cables 9, 10, then each hub 14, 15 must be dedicated to one membrane level 1, 2 at any one time and can never be connected to and operate impulse cables 9, at multiple membrane levels at the same time.

In some embodiments, a single hub may produce all of the different signals and be connected to different membrane levels. Such a hub essentially acts as multiple hubs condensed into one unit, but each facet of the unit operates independently. Such a hub would include multiple terminals for connection to multiple impulse cables. In addition, software controlling the single hub may alternate between the various facets or run them simultaneously. If the various facets are run simultaneously, it is understood that the voltages or frequencies applied to the various impulse cables must be distinct so that the various sensors can distinguish where the signal originated.

Each hub 14, 15 will also be connected to and receive signals from all of or some portion of the sensors 7, 12 arrayed at the lower membrane 2. Each hub 14, 15 can be designed to operate all of or only a portion of the entire leak detection assembly 7, 9, 10, 11, 12. Moreover, because multiple hubs 14, 15 are used to partition leak detection assemblies on large roofs so that the testing repetition of each hub or connection is reduced, the computer 13 has no problem differentiating a signal received by the sensors 7, 12 that originates at the uppermost membrane 1; a signal received by the sensors 7, 12 that originates at a lower membrane 2; and a signal that originates at the dry non-conductive material 11 outside of the main sensor array field containing second sensors 7. This is because multiple hubs 14, 15 or hubs with multiple connections to different impulse cables 9, 10 are connected to the same sensors 7, 12; can read the input from these sensors 7, 12; and can communicate with the controlling computer 13 independently of the other hubs 14, 15 or other connections within a single hub. Thus, a group of hubs 15 or connections contained within single hubs 14, 15 can be dedicated to energizing first impulse cables 10 installed on the uppermost membrane 1 and reading the signals from the first impulse cables 10 by polling the second and third sensors 7, 12 on the lower membrane 2. A second group of hubs 14 or connections contained within single hubs can be dedicated to energizing second impulse cables 9 on the lower membranes 2 and can read the signals from that second impulse cable 9 by polling the same second and third sensors 7, 12 on the lower membrane 2. All hubs, whether testing the uppermost membrane 1 or lower membranes 2 will be connected to the main sensor array including second sensors 7 and also to third sensors 12 that are positioned on the non-conductive material 11 outside of the main sensor array include second sensors 7. As such, any leakage from any edge source, be it an impingement 4 itself, or the flashing of the uppermost membrane 1, which causes water to run down the wall of the impingement 4, can be detected and the source of the leak determined.

Furthermore, the voltage at which a hub 14, 15 energizes the impulse cable 9, 10 can be varied so that, for instance, the first impulse cable 10 which covers some portion or all of the uppermost membrane 1 can be operating at 12 V, while another first impulse cable 10 also covering a portion of the uppermost membrane 1 can be operating at 11.5 volts. At the same time, the second impulse cable 9 on the lower membrane 2 may be operating at 38 V, for example. This is because the second impulse cable 9 is being driven by a separate hub 14, 15; a set of hubs 14, 15; or one of the multiple connection points dedicated to that second impulse cable 9 on a single hub 14, 15. Therefore there may be a distinct variation in voltage emanating from one or a group of hubs 14, 15; individual connection points of a single hub 14, 15 to another hub or group of hubs 14, 15; or different connection point or points contained within a single hub 14, 15. This distinct variation in voltage can determine leakage in one membrane level 1, 2, or another membrane level 1, 2, or even in distinct portions of the same membrane 1, 2 in the roofing envelope. Each level of membrane 1, 2 in the roofing envelope has installed its own impulse cable 9, 10, but only the lowest of lower membranes 2 has the second sensors 7 installed on it. Accordingly, each level of membrane 1, 2 can be operated by a separate and distinct group of hubs 14, 15 or separate and distinct impulse cables 9, 10 connections on a single hub 14, 15, and each level 1, 2 can thus have its own signature voltage so that an absolute determination of where water might be accumulating and leakage occurring can be accomplished.

Also, because water coming from the leakage at the uppermost membrane 1 must travel through the building material 3 which comprises single or multiple layers of insulation or other building materials, water may not flow directly down to the second detector array 24, but may take a circuitous route, touching the second and/or third detector arrays 24, 25 at some horizontal distance from the actual leak. Varying the voltages of different first impulse cables 10 positioned in distinct locations on the uppermost membrane 1 solve the problem of locating a general area in which to test. In addition, because water in the environment, and particularly rainwater has a low electrical conductivity, the known voltage from any impulse cable will be attenuated by the carrying water depending upon its distance from the breach in the uppermost membrane 1. This attenuation allows for a more closely determined area of leakage.

Finally, when leakage is detected in the uppermost membrane 1, even and especially if the building material 3 is particularly thick and after the general location of the leak is determined, and if the uppermost membrane 1 is completely exposed, i.e. un-ballasted or not covered with some sort of overburden, the uppermost membrane 1 can be "swept" with a high voltage broom or probe known in the industry as a holiday tester and which has its positive pole connected to the computer 13 via an additional connection lug. The path the water makes from the uppermost membrane 1 through the building material 3 has already touched the conductive material 8 and thus has already activated the second sensors 7. The high voltage and very low amperage signal attenuates almost immediately in water, similar to static electricity. This high voltage and low amperage signal will be detected by the second sensors 7 and thus the computer 13 only when the broom or probe passes over the actual breach 17 into which water has penetrated to the second sensors 7 beneath.

Alternatively, if the uppermost membrane 1 is covered with overburden such as green roofing, ballasted insulated assemblies or the like, instead of high voltage testing, a standard low voltage procedure known widely as vector mapping, and disclosed in U.S. Pat. No. 4,565,965 to Geesen, which is hereby incorporated by reference can be employed to locate the leak, again using the ability of the vector mapping unit working in conjunction with the already installed first impulse cables 10 to locate the source of the leak in the membrane. The underlying second and third detector arrays 24, 25 sense, and thus ground, the electrical impulse from the impulse cables 10, so that the vector mapping unit and probes can find the breach by taking the operator to the place in the roof where the grounding is strongest. Finally, confirmation that a breach that contains water found by this method can be provided by a probe hooked to the output terminal of the hub 15. When the probe so attached to the output terminal of hub 15 is placed in the spot where the vector mapping unit has determined that a leak exists, the computer 13 will recognize the signal, the strength of which will confirm the point of breach in the membrane.

Figure 8:
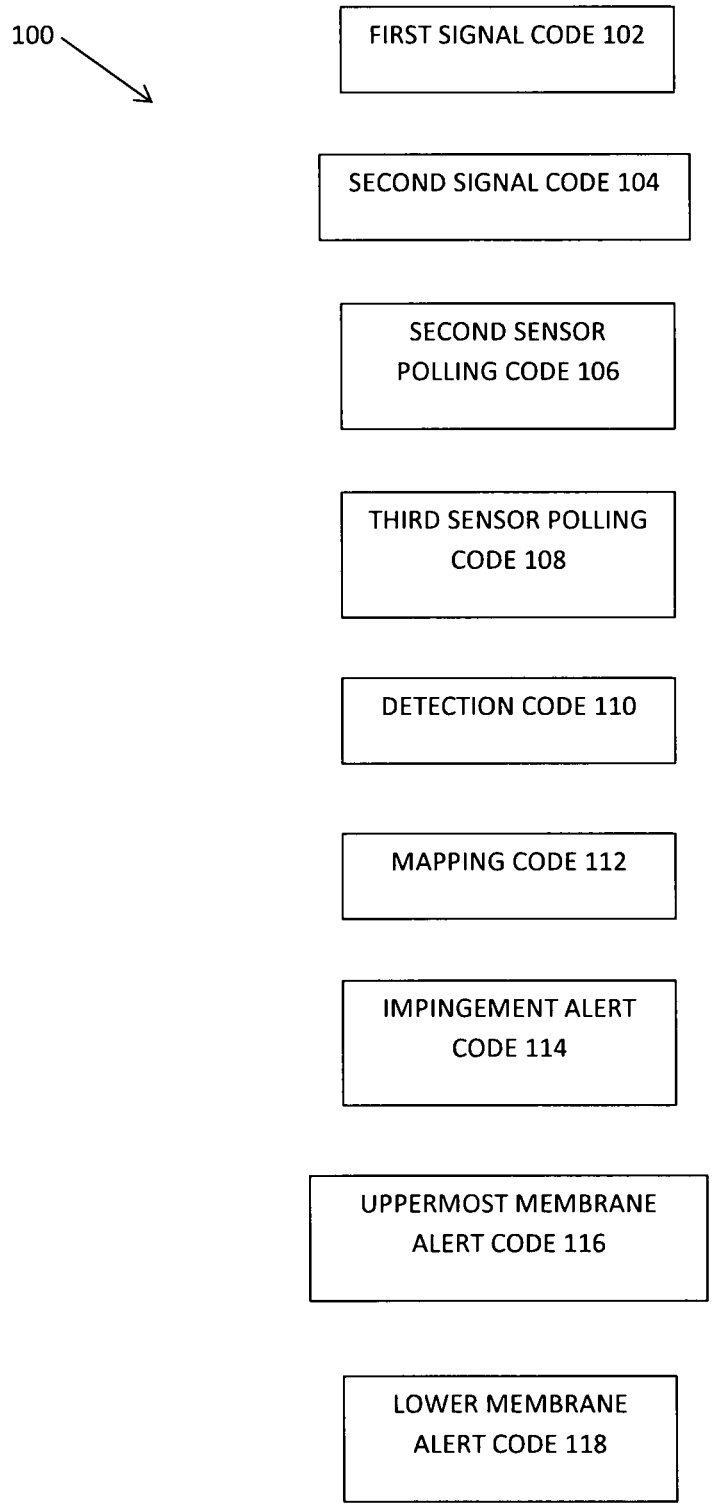
FIG. 8 is a block diagram showing the functionality of the software program of the present invention.

Now referring to FIG. 8, the functionality of software product 100 is provided. The software product 100 of the present invention includes first signal software code 102 that, when executed, causes the computer to indicate to the at least one signal generator to apply a voltage to the first impulse cable; second signal software code 104 that, when executed, causes the computer to indicate to the at least one signal generator to apply a voltage to the second impulse cable; second sensor polling software code 106 that, when executed, causes the computer to poll each of the at least one second sensors for the voltage detected at each of the at least one second sensor; third sensor polling software code 108 that, when executed, causes the computer to poll each of the at least one third sensors for the voltage detected at each of the at least one third sensor; detection software code 110 that, when executed, causes the computer to compare differences in voltage between adjacent second sensors and adjacent third sensors and changes in voltage in a single second sensor and single third sensor; mapping software code 112 that, when executed, causes the computer to transpose a representation of an electrical field onto a topological or isobar-type map of the uppermost membrane, lower membrane, and impingement; impingement alert software code 114 that, when executed, causes the computer to send an alert as to a leak in the impingement; uppermost membrane alert software code 116 that, when executed, causes the computer to send an alert as to a leak in the uppermost membrane; and lower membrane alert software code 118 that, when executed, causes the computer to send an alert as to a leak in the lower membrane.

Figure 9:
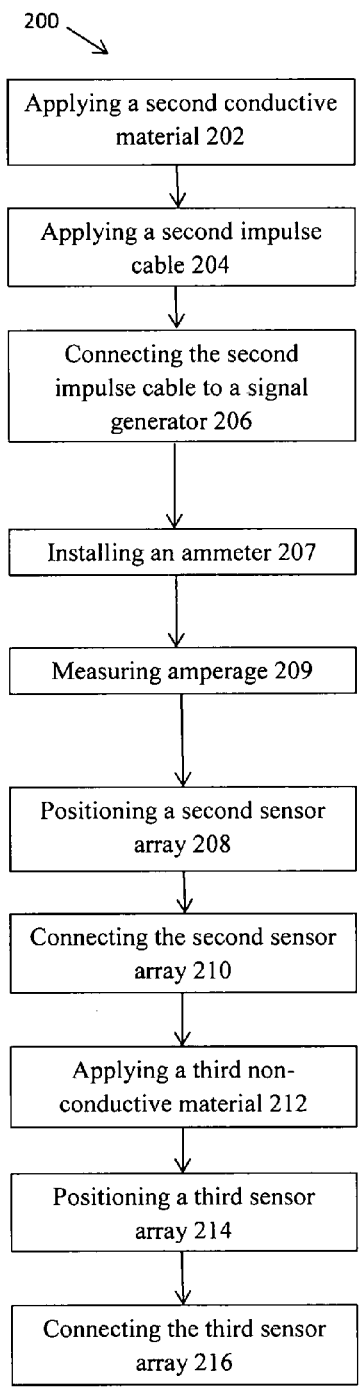
FIG. 9 is a flow chart showing the steps of the method of the present invention.
Figure 9:
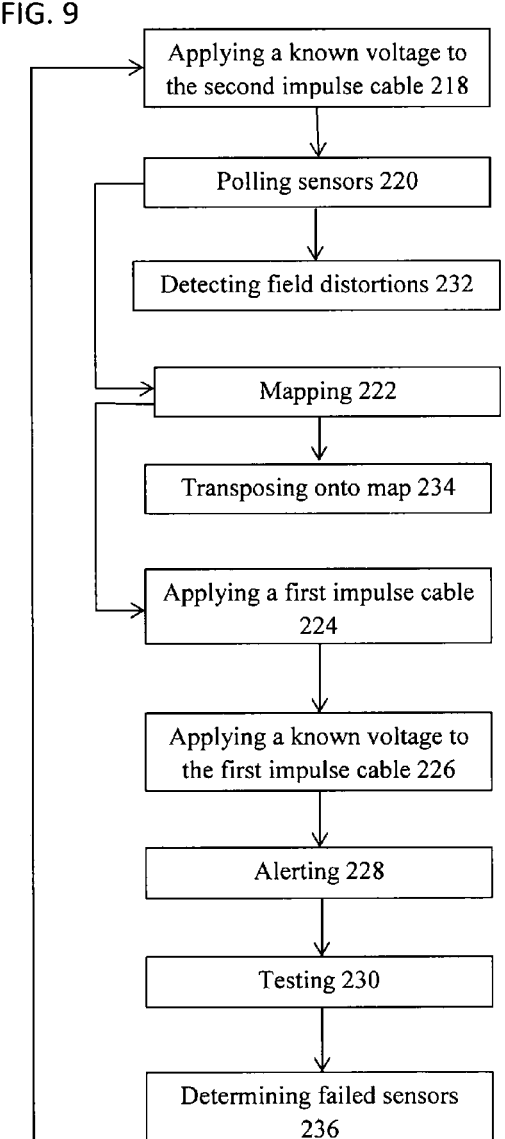

Now referring to FIG. 9, a flow chart showing the steps of the method 200 of the present invention is provided. The method 200 of the present invention includes the steps of applying a second conductive material over a lower membrane 202; applying a second impulse cable in physical contact with the second conductive material surrounding an area of the lower membrane to be tested for leaks 204; connecting the second impulse cable to a signal generator that is in electrical connection with and receives commands from a computer 206; installing an ammeter in electrical communication with at least the second impulse cable 207; measuring the amperage 209; positioning a second sensor array within the area on the lower membrane to be tested for leaks and in physical contact with the second conductive material 208; connecting the second sensor array electrically to the computer 210; applying a third non-conductive material vertically around and horizontally away from an impingement interrupting the lower membrane such that the horizontal portion of the third non-conductive material overlaps with the second conductive material and the second impulse cable is beneath an edge of the horizontal portion of the third non-conductive material 212; positioning a third sensor array on top of the third non-conductive material and between the impingement and the second impulse cable 214; connecting the third sensor array electrically to the computer 216; polling by computer each of the sensors in the second and third sensor arrays for voltage measurements at the location of each of the sensors 220; and mapping the impingement and lower membrane by computer 222. It is understood that the steps of installing an ammeter in electrical communication with the at least the second impulse cable 207 and measuring the amperage 209 may also entail installing the ammeter in electrical communication with the computer.

The method 200 shown in FIG. 9 is a preferred embodiment of the method of the present invention, but it is understood that the most basic embodiment of method 200 does not include the steps of applying a second impulse cable in physical contact with the second conductive material surrounding an area of the lower membrane to be tested for leaks 204; connecting the second impulse cable to a signal generator that is in electrical connection with and receives commands from a computer 206; applying a known voltage to the second impulse cable by the computer commanding the signal generator to apply the voltage 208; installing an ammeter in electrical communication with at least the second impulse cable 207; and measuring the amperage 209. That most basic method 200 polls the sensors in the absence of applied voltage to detect voltage created by relative humidity within the envelope.

Preferred embodiments of the method of the present invention also include the steps of applying a first impulse cable on top of an uppermost membrane surrounding an area of the uppermost membrane to be tested 224; applying a known voltage to the first impulse cable that is distinct from the known voltage applied to the second impulse cable, by a computer commanding a signal generator to apply the voltage 226; alerting by computer as to the detection and location in at least one of the uppermost membrane, the lower membrane, and the impingement 228; and testing the system by computer 230. The polling step entails detecting field distortions, where the field distortions include differences in voltage between adjacent sensors and changes in voltage in a single sensor 232. The mapping step entails transposing a representation of the electrical field detected by the sensors onto a topological or isobar-type map of the membrane or impingement to be tested and locating a leak 234. In the preferred method, the testing step entails determining the presence of failed sensors and compensating for any failed sensors 236. The steps of installing an ammeter in electrical communication with at least the second impulse cable 207 and measuring the amperage 209 may entail installing an ammeter in electrical communication with both the second impulse cable and the first impulse cable, or installing two ammeters in electrical communication with the first and second impulse cables, respectively. In either case, the ammeter or ammeters measure amperage from both cables. In addition, the steps may include connecting the ammeter or ammeters electrically to the computer.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:

1. A system for detecting and locating leaks in structures, wherein the structures comprise at least a lower membrane and an uppermost membrane, wherein the lower and uppermost membranes are selected from a group consisting of: roofing membranes and waterproofing membranes, and the lower membrane is one of a group consisting of: a lowermost membrane and a membrane between the lowermost membrane and the uppermost membrane, said system comprising:
at least one first impulse cable surrounding an area on the uppermost membrane to be tested for leaks; and
a second detector array comprising:
at least one second impulse cable surrounding an area on the lower membrane to be tested for leaks;
a second conductive material in physical contact with said second impulse cable and covering said area on the lower membrane to be tested for leaks; and
at least one second sensor disposed within said area on the lower membrane to be tested for leaks and in physical contact with said second conductive felt;
at least one signal generator in electrical communication with and capable of applying distinct, certain, defined voltages to each of said first and second impulse cables; and
a computer in electrical communication with said at least one signal generator, said first and second impulse cables, and said at least one second sensor of said second detector array, wherein said computer comprises a processor, memory, and a software product stored in the memory and executable by the processor, wherein said software product instructs said computer to communicate with said at least one signal generator, said first and second impulse cables, and said at least one second sensor of said second detector array.

2. The system as claimed in claim 1, wherein said at least one signal generator is a first signal generator in electrical communication with said first impulse cable and a second signal generator in electrical communication with said second impulse cable, and wherein both of said first and second signal generators are in electrical communication with said computer.

3. The system as claimed in claim 1, wherein said second conductive material is netting.

4. The system as claimed in claim 1, wherein the structure for which said system detects and locates leakages further comprises at least one impingement that impinges on at least the lower membrane and wherein:
said second impulse cable is set back from the at least one impingement, leaving a set-back space between said second impulse cable and the impingement; and
said system further comprises a third detector array, comprising:
a third non-conductive material comprising a vertical portion applied against the impingement and a horizontal portion applied horizontally across the lower membrane such that there is an overlap between said horizontal portion of said third non-conductive material and said second conductive material of said second detector array and said second impulse cable is beneath said third non-conductive material;
at least one third sensor disposed upon said third non-conductive material; and
said computer is further in electrical communication with said at least one third sensor.

5. The system as claimed in claim 4, wherein said at least one third sensor is disposed upon said vertical portion of said third non-conductive material.

6. The system as claimed in claim 4, wherein said second conductive material is netting and said third non-conductive material is a mesh.

7. The system as claimed in claim 4, wherein said third non-conductive material is non-absorbent.

8. The system as claimed in claim 1, wherein:
said second impulse cable is disposed on top of said second conductive material; and
said at least one second sensor is disposed underneath of said second conductive material.

9. The system as claimed in claim 1, further comprising a first ammeter in electrical communication with said at least one second impulse cable.

10. The system as claimed in claim 9, wherein said first ammeter is in further electrical communication with said at least one first impulse cable.

11. The system as claimed in claim 9, wherein said first ammeter is in further electrical communication with said computer.

12. The system as claimed in claim 10, wherein said first ammeter is in further electrical communication with said computer.

13. The system as claimed in claim 9, further comprising a second ammeter in electrical communication with said at least one first impulse cable.

14. The system as claimed in claim 13, wherein said first and second ammeters are in further electrical communication with said computer.

15. A system for detecting and locating leakage in structures, wherein the structures comprise at least one impingement that impinges on at least a lower membrane, wherein the lower membrane is one of a group consisting of: a lowermost membrane and a membrane between the lowermost membrane and an uppermost membrane, said system comprising a third detector array, comprising:
a third non-conductive material comprising a vertical portion applied against the at least one impingement and a horizontal portion applied horizontally across the lower membrane, wherein said horizontal portion of said third non-conductive material comprises an edge and said edge is disposed upon the lower membrane;
at least one second impulse cable disposed under said edge of said horizontal portion of said third non-conductive material and set back from the at least one impingement, leaving a set-back space between said second impulse cable and the impingement;
at least one third sensor disposed upon said third non-conductive material;
at least one signal generator in electrical communication with and capable of applying a certain, defined voltage to said second impulse cable; and
a computer in electrical communication with said at least one signal generator, said second impulse cable, and said at least one third sensor, wherein said computer comprises a processor, memory, and a software product stored in the memory and executable by the processor, wherein said software product instructs said computer to communicate with said at least one signal generator, said second impulse cable, and said at least one third sensor.

16. The system as claimed in claim 15, wherein said at least one third sensor is disposed upon said vertical portion of said third non-conductive material.

17. The system as claimed in claim 15, further comprising a second detector array comprising:
- a second conductive material in physical contact with said second impulse cable, wherein said second impulse cable surrounds an area on the lower membrane to be tested for leaks; and
- at least one second sensor disposed within said area on the lower membrane to be tested for leaks and in physical contact with said second conductive felt;
- wherein, said third non-conductive material is applied such that there is an overlap between said horizontal portion of said third non-conductive material and said second conductive material of said second detector array; and
- wherein said computer is in further electrical communication with said at least one second sensor of said second detector array.

18. The system as claimed in claim 17, wherein the structure for which said system detects and locates leakages further comprises an uppermost membrane, and wherein said system further comprises a first impulse cable surrounding an area on the uppermost membrane to be tested for leaks;
- wherein said at least one signal generator is in further electrical communication with and is further capable of applying a certain, defined voltage to said first impulse cable, wherein the certain, defined voltage capable of being applied to said first impulse cable is distinct from the certain, defined voltage capable of being applied to said second impulse cable; and
- wherein said computer is in further electrical communication said at least one first impulse cable.

19. The system as claimed in claim 18, wherein said at least one signal generator is a first signal generator in electrical communication with said first impulse cable and a second signal generator in electrical communication with said second impulse cable, and wherein both of said first and second signal generators are in electrical communication with said computer.

20. The system as claimed in claim 17, wherein said second conductive material is netting and said third non-conductive material is a mesh.

21. The system as claimed in claim 15, wherein said third non-conductive material is non-absorbent.

22. The system as claimed in claim 15, further comprising a first ammeter in electrical communication with said at least one second impulse cable.

23. The system as claimed in claim 22, wherein said first ammeter is in further electrical communication with said computer.

24. The system as claimed in claim 18, further comprising a first ammeter in electrical communication with said at least one second impulse cable and said at least one first impulse cable.

25. The system as claimed in claim 24, wherein said first ammeter is in further electrical communication with said computer.

26. The system as claimed in claim 18, further comprising a first ammeter in electrical communication with said at least one second impulse cable and a second ammeter in electrical communication with said at least one first impulse cable.

27. The system as claimed in claim 26, wherein said first and second ammeters are in further electrical communication with said computer.

28. A method for assembling and using a system for detecting and locating leaks in structures comprising multiple waterproofing and roofing membranes, including at least an uppermost membrane, a lower membrane, and an impingement of the lower membrane of the structure, said method comprising the steps of:
- applying a second conductive material over the lower membrane;
- positioning a second sensor array within an area on the lower membrane to be tested for leaks and in physical contact with the second conductive material;
- connecting the second sensor array electrically to a computer;
- applying a third non-conductive material vertically around and horizontally away from the impingement interrupting the lower membrane such that a horizontal portion of the third non-conductive material overlaps with the second conductive material;
- positioning a third sensor array on top of the third non-conductive material;
- connecting the third sensor array electrically to the computer;
- polling by computer each of the sensors in the second and third sensor arrays for voltage measurements at the location of each of the sensors; and
- mapping the impingement and lower membrane by computer.

29. The method as claimed in claim 28, further comprising the steps of:
- applying a second impulse cable in physical contact with the second conductive material surrounding the area of the lower membrane to be tested for leaks such that the second impulse cable is beneath an edge of the horizontal portion of the third non-conductive material;
- connecting the second impulse cable to a signal generator that is in electrical connection with and receives commands from the computer; and
- applying a first certain, defined voltage to the second impulse cable by the computer commanding the signal generator to apply the voltage.

30. The method as claimed in claim 29, further comprising the steps of:
- installing a first ammeter in electrical communication with at least the second impulse cable; and
- measuring an amperage from the first ammeter.

31. The method as claimed in claim 29, further comprising the steps of:
- applying a first impulse cable on top of the uppermost membrane surrounding an area of the uppermost membrane to be tested; and
- applying a second certain, defined voltage to the first impulse cable that is distinct from the first certain, defined voltage applied to the second impulse cable, by a computer commanding a signal generator to apply the voltage.

32. The method as claimed in claim 31, further comprising the steps of:
- installing a first ammeter in electrical communication with at least the second impulse cable; and
- measuring an amperage from the first ammeter.

33. The method as claimed in claim 32, further comprising the steps of:
- installing a second ammeter in electrical communication with the first impulse cable; and
- measuring an amperage from the second ammeter.

34. The method as claimed in claim 32, wherein said step of installing the first ammeter in electrical communication with at least the second impulse cable comprises installing the first ammeter in electrical communication the second impulse cable and the first impulse cable.

35. The method as claimed in claim 31, further comprising the steps of:
    alerting by computer as to the detection and location of a leak in at least one of the uppermost membrane, the lower membrane, and the impingement; and
    testing the system by computer, comprising the steps of determining the presence of failed sensors and compensating for any failed sensors.

36. The method as claimed in claim 28, wherein:
    said polling step comprises detecting field distortions, where the field distortions comprise differences in voltage between adjacent sensors and changes in voltage in a single sensor; and
    said mapping step comprises transposing a representation of the electrical field detected by the sensors onto a topological map of at least one of the uppermost membrane, the lower membrane, and the impingement and locating a leak.

* * * * *